Figure 1:
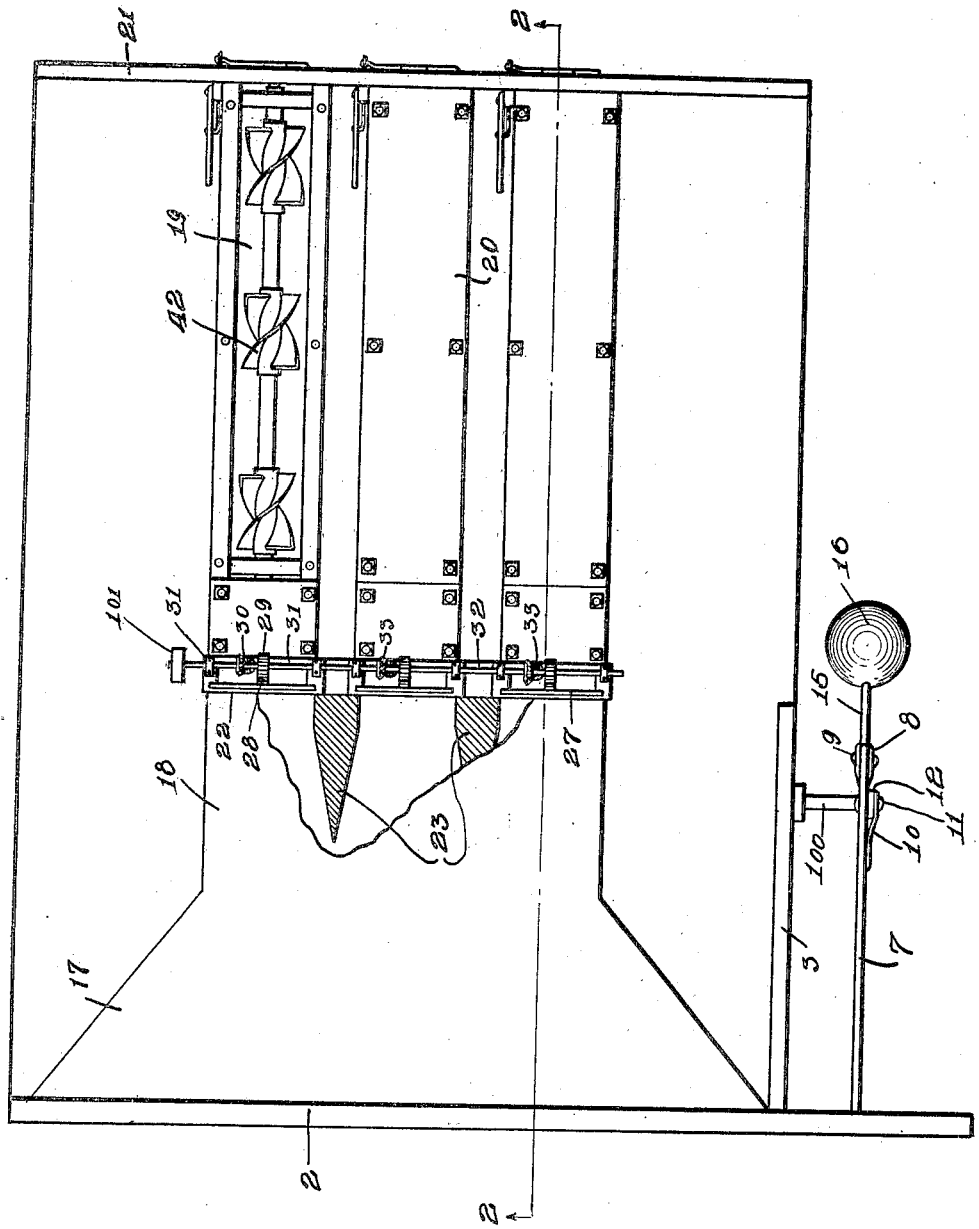

C. A. BLUME.
POWER DEVICE FOR WATER WHEELS.
APPLICATION FILED OCT. 19, 1920.

1,430,618.

Patented Oct. 3, 1922.
3 SHEETS—SHEET 1.

Inventor
C.A.Blume.

By C.A.Snow & Co.
Attorneys

C. A. BLUME.
POWER DEVICE FOR WATER WHEELS.
APPLICATION FILED OCT. 19, 1920.
1,430,618.
Patented Oct. 3, 1922.
3 SHEETS—SHEET 2.
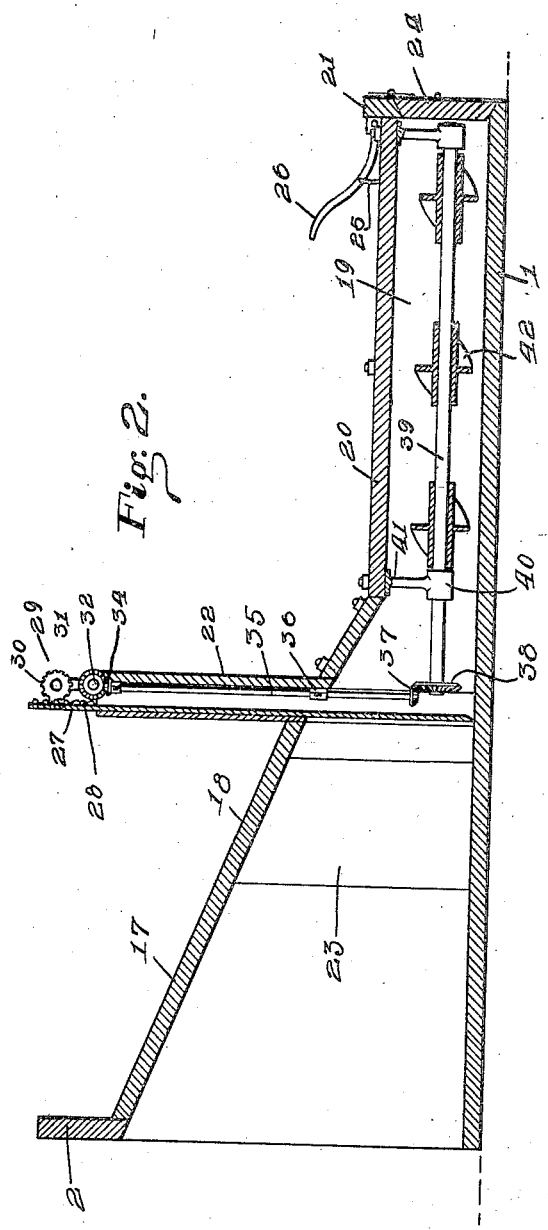
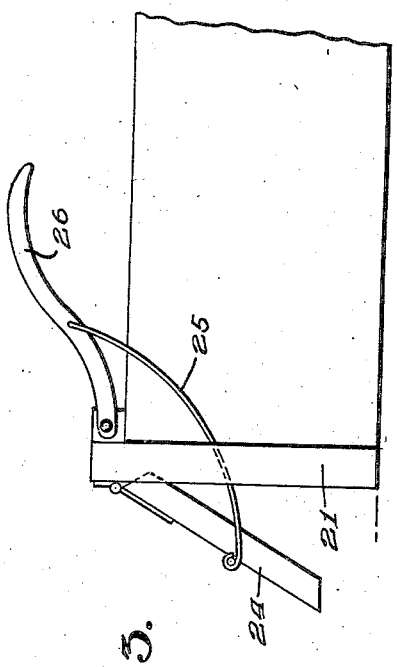
Inventor
C. A. Blume
By C. A. Snow & Co.
Attorneys

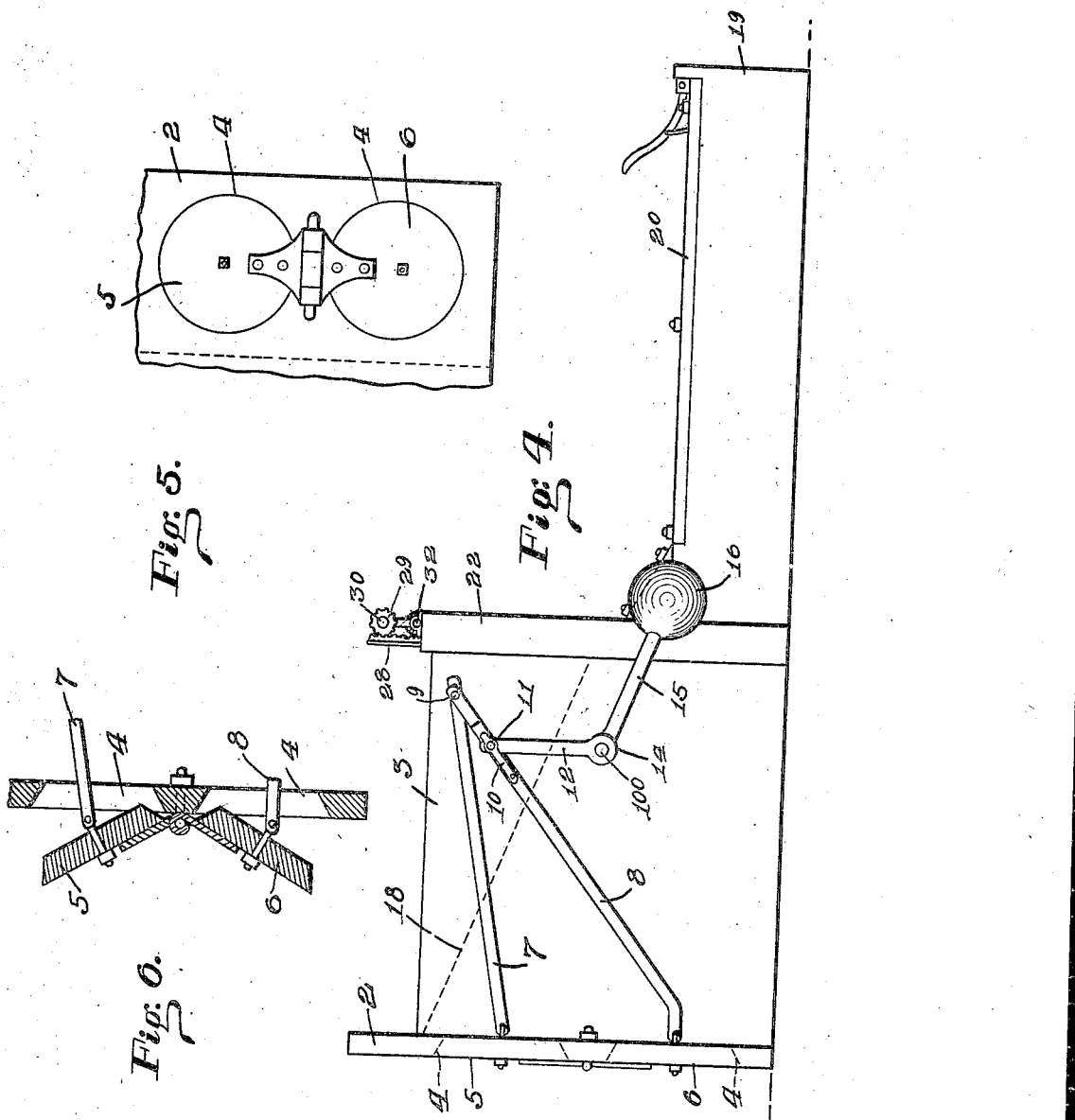

Patented Oct. 3, 1922.

1,430,618

UNITED STATES PATENT OFFICE.

CHARLES A. BLUME, OF GALESBURG, ILLINOIS.

POWER DEVICE FOR WATER WHEELS.

Application filed October 19, 1920. Serial No. 417,937.

*To all whom it may concern:*

Be it known that I, CHARLES A. BLUME, a citizen of the United States, residing at Galesburg, in the county of Knox and State of Illinois, have invented a new and useful Power Device for Water Wheels, of which the following is a specification.

It is the object of this invention to provide novel means for collecting the water in a stream, under any desired head, and for directing the water longitudinally of an approximately horizontal shaft which, being rotated by the water, transmits motion to parts to be driven.

In the accompanying drawings:—

Figure 1 shows in top plan, a device constructed in accordance with the invention, parts being broken away and parts appearing in section; Figure 2 is a longitudinal section taken approximately on the line 2—2 of Figure 1; Figure 3 is a fragmental elevation showing one of the gates; Figure 4 is a side elevation; Figure 5 is an elevation showing certain of the gates; Figure 6 is a section taken through that part of the device which appears in Figure 5, the gates being opened.

On a suitable foundation 1, an abutment 2 is erected. If desired, a wall 3 may project downstream from the abutment, although the wall 3 may be omitted if desired. In one end of the abutment 2 there are openings 4 disposed one above the other and forming a spill-way, the uppermost opening 4 being controlled by a hinged gate 5, and the lowermost opening being controlled by a hinged gate 6. A link 7 is pivoted to the gate 5, a link 8 being pivoted to the gate 6. The downstream ends of the links 7 and 8 are pivotally connected as indicated at 9. The link 8 has a side bracket 10 constituting a support for a pivot element 11 on which is mounted one arm 12 of a bell crank lever 14, comprising an arm 15 carrying a float 16. The bell crank lever 14 is fulcrumed as indicated at 100 on the wall 3 or on any other accessible support.

The abutment 2 includes a funnel-shaped collector 17 merging into a chute 18 communicating with transversely spaced flumes 19 having removable covers 20 giving access to the mechanism contained within the flumes. The flumes 19 extend to an end wall 21 on the foundation 1. Vertical air shafts 22 are located at the points where the flumes 19 communicate with the chute 18. Wedge-shaped separators 23 are disposed in the chute 18 and are located between the air shafts 22.

The passage of the water from the chute 18 to the flumes 19 is controlled by vertically operated gates 27 slidably mounted in the air shafts 22 and provided with racks 28 engaged by pinions 29 on shafts 30 mounted to rotate in bearings 31 mounted on the upper ends of the air shafts 22, any suitable means (not shown) being provided for rotating the shafts 30. The egress of the water from the flumes 19 is controlled by hingedly mounted gates 24 to which links 25 are pivoted, the links being pivoted to levers 26 fulcrumed on the end wall 21. Any suitable means under the control of an operator may be supplied for operating the levers 26.

A driven shaft 32 is mounted to rotate in the bearings 31 and is located below the shafts 30. The driven shaft 32 is supplied at one end with any suitable means, indicated at 101, whereby the power may be transmitted to a distant point. There are beveled pinions 33 on the driven shaft 32, the pinions 33 meshing into beveled pinions 34 on the upper ends of vertical shafts 35 located in the air shafts 22 and journaled for rotation in bearings 36 disposed within the air shafts. On the lower ends of the shafts 35 there are beveled pinions 37 meshing into beveled pinions 38 on horizontal shafts 39 located in the flumes 19 and journaled in bearings 40 constituting part of hangers 41 carried by the sides of the flumes 19. Spiral blades 42 are mounted on the shafts 39 and are located in the flumes 19.

The abutment 2 may extend entirely across the stream, like a dam, and in practical operation, should the water rise to an undue height, the float 16, operating the bell crank 14, will transmit motion to the gates 5 and 6 by way of the links 7 and 8, and open the gates, thereby preventing too high a head behind the abutment 2. Should it be found that the float 16 is ineffective to operate the gates 5 and 6, under all circumstances, then any other suitable means, under the control of an operator may be provided for bringing about the desired result.

The water in the stream is received by the funnel-shaped collector 17 and is directed into the chute 18. The water, as it enters the chute 18, comes in contact with the wedge-shaped separators 23 and is directed thereby into the flumes 19. The amount of water delivered into the flumes may be regulated by raising and lowering the gates 27. Especial attention is directed to the fact that the shafts 22 admit air into the water, before the water enters the flumes 19. The flow of the water thus is enhanced, and the efficiency of the device is promoted accordingly.

The water, traversing the flumes 19, imparts rotation to the shafts 39 by way of the spiral blades 42, the outflow of the water being controlled by means of the gates 24. When the shafts 39 are rotated, motion is transmitted to the shafts 35 by way of the beveled pinions 38 and 37. Finally motion is transmitted to the driven shaft 32 through the instrumentality of the beveled pinions 34 and 33, the power being taken off the driven shaft 32 by any suitable element shown at 101. Should it become necessary to adjust or repair the blades 42, the covers 20 may be removed from the flumes 19, it being understood that the covers are suitably packed so as to prevent leakage.

Having thus described the invention, what is claimed is:—

1. In a device of the class described, a funnel-shaped collector; a flume whereinto the collector discharges; an air shaft located between the collector and the flume; a gate in the air shaft and controlling the passage of water from the collector to the flume; a substantially horizontal shaft journaled in the flume; and a spiral blade on the last specified shaft.

2. In a device of the class described, a collector; a chute; a flume whereinto the chute discharges; a substantially vertical air shaft located between the chute and the flume, a gate in the air shaft and controlling the passage of water from the collector to the flume; a water wheel in the flume; and gearing driven by the water wheel, a portion of the gearing extending upwardly through the air shaft.

3. In a device of the class described, an abutment; a funnel-shaped collector carried thereby; a gate in the abutment at one side of the collector; means for operating the gate; a flume whereinto the collector discharges; an air shaft located between the collector and the flume; a gate in the air shaft and controlling the passage of water from the collector to the flume; a water wheel in the flume; and gearing connected with the water wheel, a portion of the gearing being located in the air shaft.

In testimony that I claim the foregoing as my own, I have hereto affixed my signature in the presence of two witnesses.

CHARLES A. BLUME.

Witnesses:
R. C. RICE,
L. E. JOHNSON.